US006870483B1

(12) United States Patent
Davis

(10) Patent No.: US 6,870,483 B1
(45) Date of Patent: Mar. 22, 2005

(54) LOCATOR APPARATUS

(76) Inventor: Everton Davis, 6121 Glade Ave., B 109, Woodland Hills, CA (US) 91367

( * ) Notice: Subject to any disclaimer, the term of this patent is extended or adjusted under 35 U.S.C. 154(b) by 55 days.

(21) Appl. No.: 10/650,439

(22) Filed: Aug. 27, 2003

(51) Int. Cl.[7] ............................ H04Q 5/22; G08B 1/08; H04M 1/50

(52) U.S. Cl. ................................ 340/691.1; 340/10.31; 340/539.1; 340/539.2; 340/539.32; 340/571; 340/572; 340/572.1; 340/692; 379/354; 379/355; 379/356; 379/357; 379/359

(58) Field of Search ........................... 340/10.31, 539.1, 340/539.2, 539.32, 571, 572.1, 691.1, 692; 379/354–359

(56) References Cited

U.S. PATENT DOCUMENTS 4,507,653 A 3/1985 Bayer
5,452,352 A * 9/1995 Talton .................. 379/355.05
5,689,238 A 11/1997 Cannon, Jr.
5,781,109 A 7/1998 Nakajima

* cited by examiner

*Primary Examiner*—Brent A. Swarthout
*Assistant Examiner*—Lam Pham
(74) *Attorney, Agent, or Firm*—Matthew J. Pierce

(57) ABSTRACT

A locator apparatus for locating a lost wallet, pocketbook, or a purse is disclosed. Other embodiments of the apparatus could be incorporated into other commonly used items such as purses, sunglasses, keys, etc. The apparatus would be a phone chip and speaker combination that would be incorporated into any one of a wide variety of items that are both frequently used and frequently misplaced, such as wallets, pocketbooks, purses, keys, sunglasses or regular glasses, and other such items. The phone chip would be capable of "receiving" a telephone call, at which time, it would activate the speaker, which would begin to make noise. This noise would allow an individual to find the appropriate "lost" or misplaced item quickly and efficiently.

4 Claims, 1 Drawing Sheet

LOCATOR APPARATUS

BACKGROUND OF THE INVENTION

The present invention concerns that of a new and improved apparatus for locating a lost wallet, pocketbook, or purse.

DESCRIPTION OF THE PRIOR ART

U.S. Pat. No. 5,781,109, issued to Nakajima, discloses a system comprised of a transmitter with an alarm constructed to resemble a credit card for the prevention of loss of personal property, such as a wallet.

U.S. Pat. No. 5,689,238, issued to Cannon, Jr., discloses an object locator system comprised of an electronic tag with a unique response code capable of emitting a sound when a signal is sent.

U.S. Pat. No. 4,507,653, issued to Bayer, discloses an electronic detecting and sounding device for finding a plurality of items, such as a purse or wallet.

SUMMARY OF THE INVENTION

The present invention concerns that of a new and improved apparatus for locating a lost wallet, pocketbook, or a purse. Other embodiments of the apparatus could be incorporated into other commonly used items such as purses, sunglasses, keys, etc. The apparatus would be a phone chip and speaker combination that would be incorporated into any one of a wide variety of items that are both frequently used and frequently misplaced, such as wallets, pocketbooks, purses, keys, sunglasses or regular glasses, and other such items. The phone chip would be capable of "receiving" a telephone call, at which time, it would activate the speaker, which would begin to make noise. This noise would allow an individual to find the appropriate "lost" or misplaced item quickly and efficiently.

There has thus been outlined, rather broadly, the more important features of a locater apparatus that the detailed description thereof that follows may be better understood and in order that the present contribution to the art may be better appreciated. There are, of course, additional features of the locater apparatus that will be described hereinafter and which will form the subject matter of the claims appended hereto.

In this respect, before explaining at least one embodiment of the locater apparatus in detail, it is to be understood that the locater apparatus is not limited in its application to the details of construction and to the arrangements of the components set forth in the following description or illustrated in the drawings. The locater apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present locater apparatus. It is important, therefore, that the claims be regarded as including such equivalent constructions insofar as they do not depart from the spirit and scope of the present invention.

It is therefore an object of the present invention to provide a locater apparatus which has all of the advantages of the prior art and none of the disadvantages.

It is another object of the present invention to provide a locater apparatus which may be easily and efficiently manufactured and marketed.

It is another object of the present invention to provide a locater apparatus which is of durable and reliable construction.

It is yet another object of the present invention to provide a locater apparatus which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
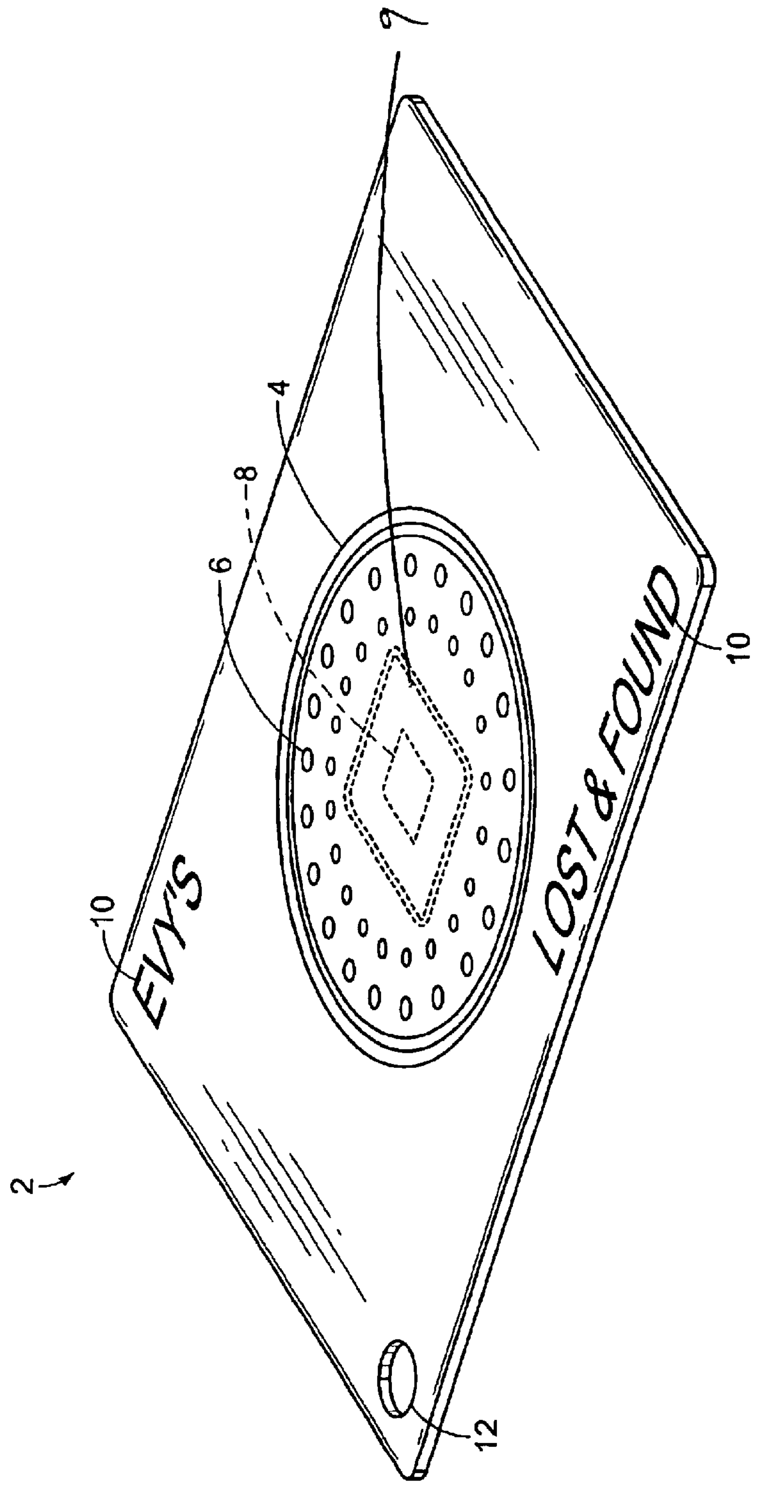
FIG. 1 shows a perspective view of the present invention.

Priority is hereby claimed to application 60/406,090, filed on Aug. 27, 2002.

FIG. 1 shows a perspective view of the present invention. Card 2 would have two sides, a front side and a back side, with the front side being shown in FIG. 1. Card 2 would be the same size as a credit card or ATM card to allow card 2 to be carried in a wallet, pocketbook, or purse in the same area as credit cards and ATM cards. Card 2 has a length of approximately three and three-eighths of an inch and a width of two and one-eighth of an inch.

Card 2 has a central cutout region 4 that is preferably cylindrical, but can take on other shapes as well. Within this cutout region 4 is located speaker 6 and phone chip 8, which would be integrally connected to one another. Phone chip 8 would preferably be square-shaped and would be located within the boundaries of speaker 6, which would surround the phone chip 8 and occupy the rest of the spot within the cutout region 4.

Phone chip 8 would be capable of receiving phone calls and would have a specific telephone number which would activate it. A user would not be able to actually talk on the card 2 as if the card 2 were a regular phone. Rather, the phone chip 8, upon being "called," would merely activate and then notify the speaker 6. The speaker 6 then would begin to make noise, preferably beeps, which would let the user know where their wallet, pocketbook, or purse might be located. Phone chip 8 and speaker 6 are powered by power means 9, which is preferably a battery that is incorporated into the phone chip 8.

Card 2 also has an incorporated logo 10 on the front surface of the card 2. In addition, card 2 also has a key chain hole 12, which would allow card 2 to alternatively be attached to a key chain.

The phone chip 8 and speaker 6 combination need not be limited to a card 2, as shown in FIG. 1. Phone chip 8 and speaker 6 could be used in conjunction with a wide variety of frequently used items, such as purses, sunglasses, keys, and other such items. Other items that would best used in conjunction with phone chip 8 and speaker 6 would be items that are both frequently used and frequently misplaced.

What I claim as my invention is:

1. A locator apparatus comprising:

(a) a card having two sides comprising a front side and a rear side, (b) a central cutout region in the middle of the card, the central cutout region having a circular shape, (c) a circular speaker mounted within the central cutout region, (d) a telephone computer chip attached to the circular speaker, the telephone computer chip electronically connected to the circular speaker, the telephone computer chip capable of receiving telephone calls to a particular telephone number, (e) power means for providing power to the circular speaker and the telephone computer chip, (f) wherein the telephone computer chip, upon being called by another telephone, will activate the speaker, causing the speaker to emit noise.

2. A locator apparatus according to claim 1 wherein the card has a length of three and three-eighths of an inch and a width of two and one-eighth of an inch.

3. A locator apparatus according to claim 2 wherein the card also has a key chain hole.

4. A locator apparatus according to claim 3 wherein the card also has a logo placed on the front side of the card.

* * * * *